(12) United States Patent
Kniess (10) Patent No.: US 12,007,780 B2
(45) Date of Patent: Jun. 11, 2024

(54) SYSTEM AND METHOD FOR DETERMINING A POSITION AND/OR ORIENTATION OF A SWAP BODY IN RELATION TO A VEHICLE

(71) Applicant: ZF Friedrichshafen AG, Friedrichshafen (DE)

(72) Inventor: Patrick Kniess, Aulendorf (DE)

(73) Assignee: ZF Friedrichshafen AG, Friedrichshafen (DE)

(*) Notice: Subject to any disclaimer, the term of this patent is extended or adjusted under 35 U.S.C. 154(b) by 799 days.

(21) Appl. No.: 17/253,476

(22) PCT Filed: May 27, 2019

(86) PCT No.: PCT/EP2019/063570
§ 371 (c)(1),
(2) Date: Dec. 17, 2020

(87) PCT Pub. No.: WO2020/001882
PCT Pub. Date: Jan. 2, 2020

(65) Prior Publication Data
US 2021/0278856 A1 Sep. 9, 2021

(30) Foreign Application Priority Data

Jun. 26, 2018 (DE) ..................... 10 2018 210 351.8

(51) Int. Cl.
*G05D 1/00* (2006.01)
*B60P 1/64* (2006.01)
(Continued)

(52) U.S. Cl.
CPC ............ *G05D 1/0225* (2013.01); *B60P 1/649* (2013.01); *G01S 17/42* (2013.01); *G01S 17/87* (2013.01); *G01S 17/931* (2020.01)

(58) Field of Classification Search
CPC .......... G05D 1/0225; B60P 1/649; B60P 7/13; G01S 17/42; G01S 17/87; G01S 17/931; G01S 17/08; G01S 17/88; G08G 1/163
See application file for complete search history.

(56) References Cited

U.S. PATENT DOCUMENTS

2002/0154005 A1* 10/2002 Wall .................. B60D 1/36
340/431
2007/0027581 A1 2/2007 Bauer et al.
(Continued)

FOREIGN PATENT DOCUMENTS

CN 1795121 A 6/2006
DE 10 2004 043 761 A1 3/2006
(Continued)

OTHER PUBLICATIONS

First Office Action in Corresponding Chinese Application No. 201980042631.0, dated May 31, 2022 (English Translation) (8 pages).
(Continued)

*Primary Examiner* — Adam R Mott
*Assistant Examiner* — Elizabeth Rose Neleski
(74) *Attorney, Agent, or Firm* — Crowell & Moring LLP (57) ABSTRACT

The invention relates to a system for determining a position and orientation of a swap body in relation to a vehicle while aligning the vehicle under the swap body. The system has three distance sensors which can be placed on the vehicle oriented in the longitudinal direction thereof, each of which is configured to determine a longitudinal distance between the vehicle and predetermined measurement points on the swap body, and output a corresponding signal. The system has a signal processing device that is configured to determine a relative position and/or relative orientation of the swap body to the vehicle based on the signals output by the
(Continued)

three distance sensors, and output a corresponding output signal.

17 Claims, 4 Drawing Sheets

(51) Int. Cl.
*G01S 17/42* (2006.01)
*G01S 17/87* (2020.01)
*G01S 17/931* (2020.01)

(56) References Cited

U.S. PATENT DOCUMENTS

| | | |
|---|---|---|
| 2012/0191285 A1 | 7/2012 | Woolf et al. |
| 2015/0347840 A1 | 12/2015 | Iida |
| 2017/0369101 A1 | 12/2017 | Sommer et al. |
| 2018/0067484 A1* | 3/2018 | Troy .................. G01S 17/88 |
| 2019/0272756 A1* | 9/2019 | Naito .................. G08G 1/163 |

FOREIGN PATENT DOCUMENTS

| | | |
|---|---|---|
| DE | 10 2005 008 874 A1 | 9/2006 |
| DE | 10 2005 015 771 | 10/2006 |
| DE | 10 2006 035 929 | 2/2008 |
| DE | 10 2006 057 610 | 4/2008 |
| DE | 102012005707 A1 | 10/2012 |
| DE | 10 2012 025 317 A1 | 6/2014 |
| DE | 10 2018 210 351 | 1/2020 |
| EP | 3 260 357 A1 | 6/2017 |
| WO | WO 2020/001882 A1 | 1/2020 |

OTHER PUBLICATIONS

Search Report issued in German Patent Application No. DE 10 2018 210 351.8 dated Mar. 29, 2019 (8 pages).
International Search Report (4 pages) with English translation (2 pages) and Written Opinion (5 pages) issued in PCT/EP2019/063570, completed on Jul. 31, 2019 and dated Aug. 13, 2019.
Roland Stahn et al, "Laser Scanner-Based Navigation for Commercial Vehicles", Intelligent Vehicles Symposium, 2007 IEEE, IEEE, PI, (Jun. 1, 2007), ISBN 978-1-4244-1067-5, pp. 969-974, XP031127072 [A] 1-11 (6 pages).

* cited by examiner

SYSTEM AND METHOD FOR DETERMINING A POSITION AND/OR ORIENTATION OF A SWAP BODY IN RELATION TO A VEHICLE

CROSS-REFERENCE TO RELATED APPLICATIONS

This application is a U.S. national stage application under 35 U.S.C. § 371 of PCT Application No. PCT/EP2019/063570, filed on May 27, 2019, and published as WO 2020/001882 A1 on Jan. 2, 2020, which claims priority from German Application No. 10 2018 210 351.8, filed on Jun. 26, 2018, the entirety of which are each hereby fully incorporated by reference herein.

TECHNICAL FIELD

The present invention relates to a system and a method for determining a position and/or orientation of a swap body in relation to a vehicle. In particular, the invention relates to a system and a method for aligning a vehicle under a swap body, in order to simplify the receiving thereof.

PRIOR ART

There are systems known from the prior art for assisting in aligning vehicles intended for accommodating swap bodies underneath swap bodies. By way of example, DE 10 2006 057 610 A1 discloses a system in which a vehicle is assisted in receiving a swap body by imaging sensors. Distances between the vehicle and the swap body can be determined with this system, such that it can effectively intervene in the receiving process.

SUMMARY OF THE INVENTION

The present invention relates to a system for determining a position and/or orientation of a swap body in relation to a vehicle while the vehicle is being aligned under the swap body. The system has three distance sensors, which can be oriented in the longitudinal direction on the vehicle, each of which is configured to determine longitudinal distances between the vehicle and predefined measurement points on the swap body, and to output a corresponding signal.

The system also has a signal processing device that is configured to determine a position and/or orientation of the swap body in relation to the vehicle on the basis of the signals output by the three distance sensors, and to output a corresponding output signal.

According to the fundamental concept of the present invention, a system is created in which three longitudinal distance lasers can be installed on a vehicle. These distance sensors can be attached to the vehicle such that they can determine a longitudinal distance to the rear.

Each of the three distance sensors can emit a measurement beam for measuring the distance. The measurement beams are such that when the three distance sensors are mounted and calibrated on the vehicle, the measurement beams run parallel to the longitudinal axis of the vehicle. In other words, the measurement beams from the distance sensors are pointed toward the rear, parallel to the longitudinal axis of the vehicle.

Two of the three distance sensors can be spaced apart laterally on the vehicle. In other words, these distance sensors can be mounted on the vehicle as a pair, spaced apart laterally on the vehicle. The two distance sensors can be at substantially the same point along the longitudinal axis of the vehicle.

The two distance sensors can be arranged or placed symmetrically on the vehicle in relation to a vertical longitudinal plane of the vehicle. In other words, the two distance sensors can be placed at the same lateral distance to the vertical longitudinal plane through the vehicle.

The two distance sensors can be aligned on the vehicle such that their respective measurement beams pass laterally by the guide rollers located behind the respective distance sensors in the longitudinal direction of the vehicle. By way of example, the two distance sensors can be aligned on the vehicle such that their respective measurement beams pass laterally outside the guide rollers located behind the respective distance sensors in the longitudinal direction of the vehicle.

The system can also contain a calibration system, which has a calibration device that provides a feature. A distance sensor can be aligned with the feature provided by the calibration device. The system can also have an adjustment device for aligning the distance sensors with the feature.

The feature can be a mark or a hole through which light passes. The calibration system can have two calibration devices, such that the distance sensor can be aligned with both calibration devices. By way of example, one calibration device can contain a hole through which light passes, and the other calibration device can have a mark. The distance sensor can then be adjusted with the adjustment device, such that its measurement beam passes through the hole in the one calibration device and strikes the mark on the other calibration device.

The calibration device can be designed such that it can be placed in a guide hole for the guide rollers. The guide rollers can be designed such that they can be rotatably mounted about a substantially vertical or upright axis in a receiving structure on the vehicle. The guide rollers can be conical, for example, such that the diameters of each of the guide rollers at the lower end is greater than at the upper end. The aforementioned guide holes can be formed in the receiving structure such that the guide rollers can be placed therein. The calibration devices can then be placed in these guide holes for the calibration process.

The adjustment device can be configured to enable a lateral and vertical positioning of the distance sensors in relation to the vehicle, as well as an orientation of the distance sensors. By way of example, the adjustment device can have a sled for a distance sensor, which can be moved in the desired direction, and can also be oriented as described above.

To calibrate the distance sensors, the adjustment device for the calibration devices placed in the guide holes, e.g. the aforementioned combination of a calibration device with a hole through which light passes and a calibration device with a mark, can be configured to position the distance sensor laterally and vertically in relation to the vehicle such that its measurement beam passes through the hole. Because of the adjustability of the adjustment device, the orientation of the measurement beam of the distance sensors can be altered such that the measurement beam passes not only through the hole, but also strikes the mark on the other calibration device. If this is the case, the distance sensor is calibrated correctly, and can be used for the intended measurement.

One of the three distance sensors can be placed at a higher position that the other two distance sensors for detecting an end surface of the swap body.

The distance sensors can be laser sensors.

The invention also relates to a vehicle for a swap body. The vehicle can have a receiving structure for receiving the swap body. The vehicle can also contain the system described above. The three distance sensors can be placed on the rear surface of the driver's cab. Two of the distance sensors, or all three, can also be mounted on the receiving structure, using a mounting bracket. The height of the receiving structure can be adjustable. This makes it possible to align the distance sensors to a guide assembly on the swap body, e.g. at the end of the swap body.

The vehicle can contain a control unit for autonomous operation. The control unit can at least enable autonomous operation when receiving the swap body. The control unit can be sent the output signal from the signal processing device for autonomous operation of the vehicle.

The invention also relates to a method for determining a position and/or orientation of a swap body in relation to a vehicle while the vehicle is being aligned under the swap body. The method can be executed with a system or a vehicle that has one or more of the features of the system described above.

The method can comprise a step for determining a longitudinal distance from the vehicle to predefined points on the swap body using three distance sensors, which are oriented toward the rear on the vehicle in the longitudinal direction thereof. The method can also comprise a step for determining a relative position and/or orientation of the swap body in relation to the vehicle on the basis of the determined longitudinal distances.

The method can also comprise a step for positioning the distance sensors such that they can detect predetermined measurement points on the swap body when aligning the vehicle under the swap body. Two of the predefined measurement points can be placed on the inner surfaces of guide rails forming a guide channel on the swap body. One of the predefined measurement points can be on an end surface of the swap body.

The method can also comprise a step for calibrating two of the distance sensors such that their respective measurement beams pass laterally outside guide rollers located behind the respective distance sensors in the longitudinal direction of the vehicle.

The calibration step for each distance sensor can comprise placing a calibration device in a guide hole for a guide roller located behind the distance sensor in the longitudinal direction of the vehicle, and positioning the distance sensor such that its position and orientation corresponds to specifications based on the calibration device.

DESCRIPTION OF THE EMBODIMENTS

Embodiments shall be described below in reference to the drawings. It should be noted that the same reference symbols in the various figures refer to the same or similar elements.

Figure 1:
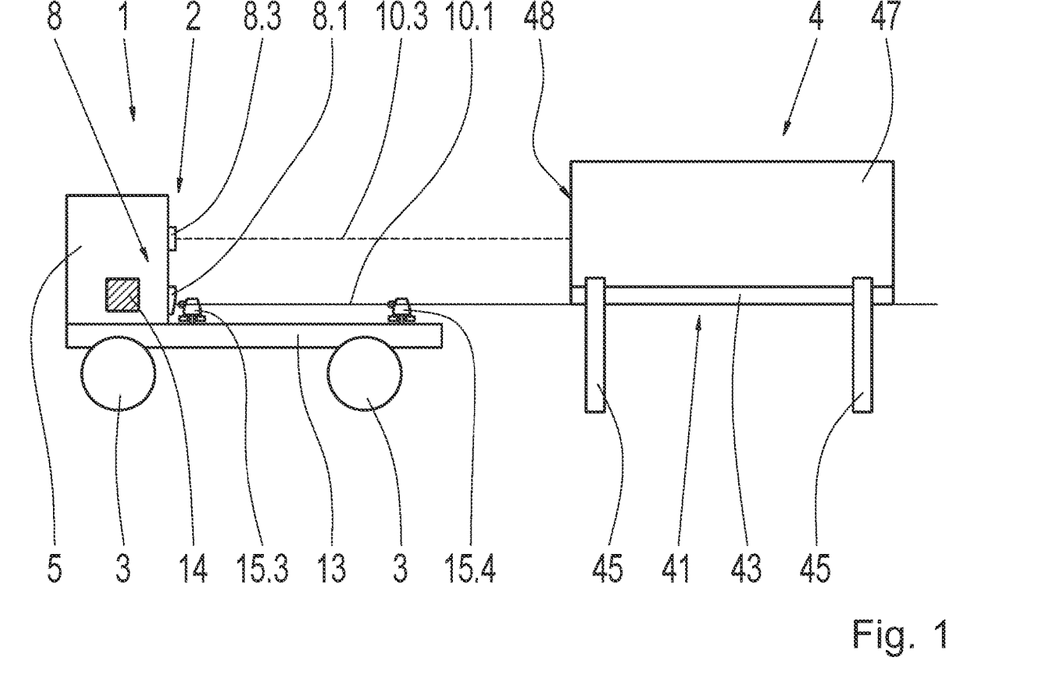
FIG. 1 shows a schematic side view of a vehicle and a swap body to which the inventive concept can be applied.
Figure 2:
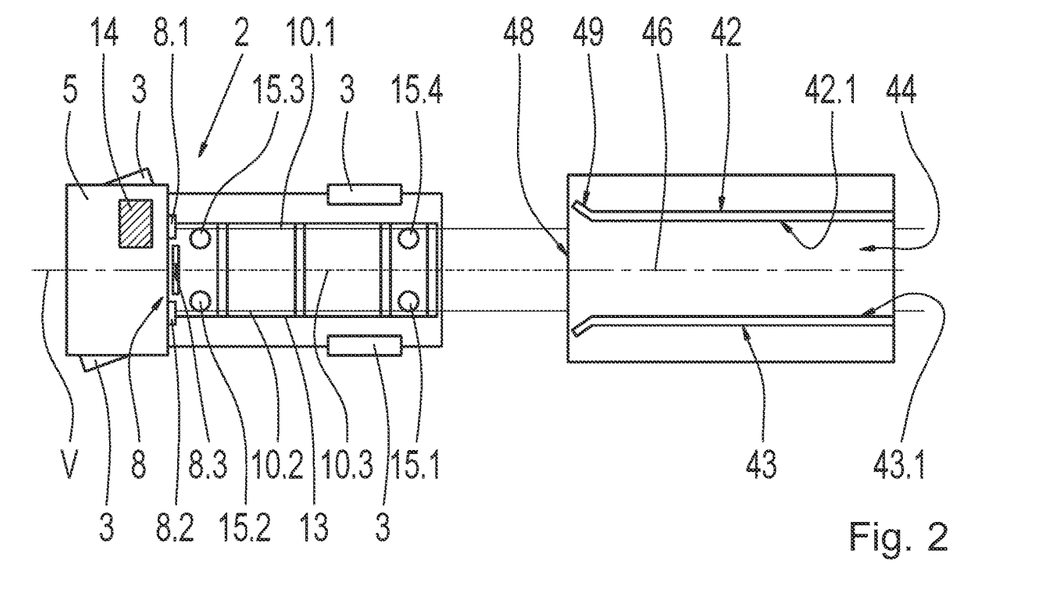
FIG. 2 shows a schematic top view of the vehicle and the swap body shown in FIG. 1.
Figure 3:
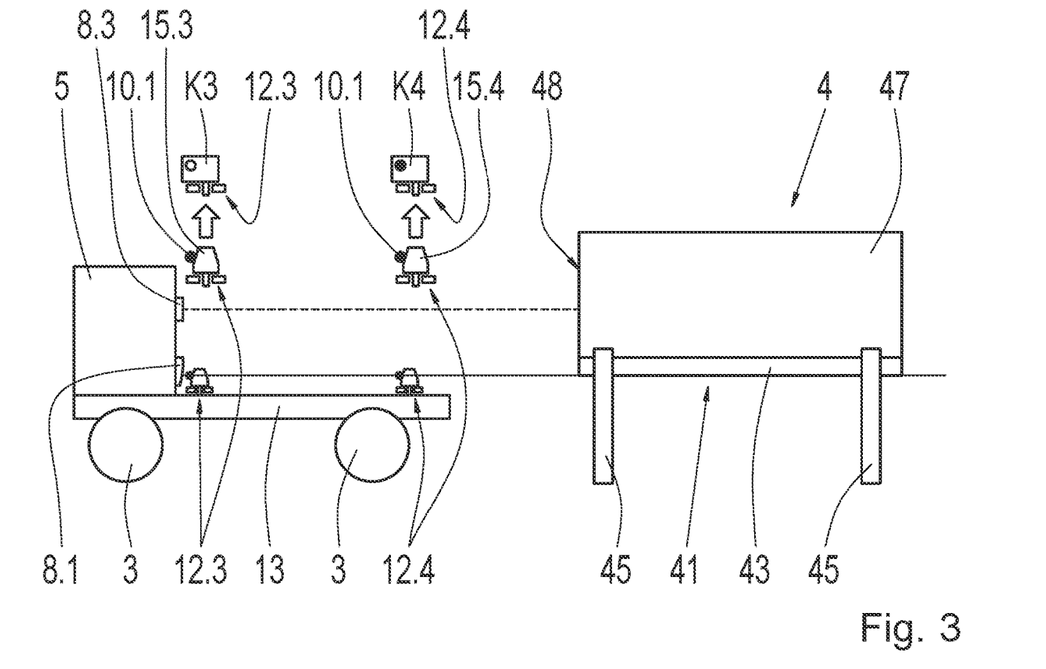
FIG. 3 shows a schematic side view of the vehicle and the swap body shown in FIG. 1, in which the use of calibration devices is also shown.

FIGS. 1, 2 and 3 show a vehicle 1 designed to accommodate swap bodies. These figures also show a swap body 4 that the vehicle 1 accommodates. The vehicle 1 has a driver's cab 5 and a receiving structure 13 at its rear. The vehicle has a front axle and two rear axles in the drawings, each of which have wheels 3. Various other configurations are also conceivable. The vehicle also does not necessarily have to have a driver's cab 5, in particular when the vehicle is an autonomous vehicle.

The swap body is parked behind the vehicle 1 in the longitudinal direction. The swap body 4 is accommodated by driving the vehicle 1 under the swap body 4.

It can also be seen in the figures that guide elements 15.1, 15.2, 15.3, 15.4 are placed on the receiving structure 13 on the vehicle 1. As can be particularly readily seen in FIG. 2, two guide elements 15.1, 15.4 have been attached to the rear of the vehicle 1, which are spaced apart laterally. Guide elements 15.2, 15.3 are shown on the front of the receiving structure 13, which are likewise spaced apart laterally. The guide elements are guide rollers in this embodiment. The guide rollers 15.1, 15.4 mounted on the rear of the receiving structure 13 form a first pair of guide elements. The guide elements 15.2, 15.3 attached to the front of the receiving structure 13 form a second pair of guide elements. The first pair of guide elements is spaced apart longitudinally from the second pair of guide elements. In the present embodiment, there are therefore four guide elements 15.1, 15.2, 15.3, 15.4 on the receiving structure 13, each of which is mounted at one of the four corners of an imaginary rectangle.

In the present embodiment, the guide elements or guide rollers can each rotate about a vertical axis on the receiving structure 13 on the vehicle. To be able to retain the guide rollers in the manner described herein, the receiving structure 13 on the vehicle 1 has guide roller receivers in which the guide rollers are retained such that they can rotate about the their axes. Although each guide roller is retained on the receiving structure 13 on the vehicle 1 with such a guide roller receiver, only two guide roller receivers 12.3, 12.4 are shown for the guide rollers 15.3, 15.4 in FIG. 3. The guide roller receivers for the guide rollers 15.1, 15.2 have a symmetrical design to that of the other guide roller receivers 12.3, 12.4.

The rollers are also conical in the present embodiment, such that the diameters of the guide rollers at the bottom are greater than at the top. Each of the guide rollers can have a cylindrical section at the bottom, and a conical section at the top, with a conical outer surface.

A system 2 for determining a position and/or orientation of the swap body 4 in relation to the vehicle 1 when aligning the vehicle 1 under the swap body 4 is provided on the vehicle 1 or on its receiving structure 13. The system has three distance sensors 8.1, 8.2, 8.3. These distance sensors 8.1, 8.2, 8.3 are oriented on the vehicle 1 in the longitudinal direction thereof. More precisely, the distance sensors 8.1, 8.2, 8.3 are arranged on the vehicle such that they can detect a longitudinal distance toward the rear. Each of the three distance sensors 8.1, 8.2, 8.3 is configured to determine a longitudinal distance D1, D2, D3 between the vehicle 1 and predefined measurement points M1, M2, M3 on the swap body 4, and to output a corresponding signal. As can be seen in FIGS. 1 and 2, two of the distance sensors 8.1, 8.2 form a pair. These two sensors 8.1, 8.2 are spaced apart laterally on the vehicle 1. More precisely, the distance sensors 8.1, 8.2 are arranged symmetrically in relation to a vertical longitudinal plane V in the embodiment shown herein. Another sensor 8.3 is located at the lateral midpoint of the vehicle 1 and above the other distance sensors 8.1, 8.2 in this embodiment.

The distance sensors are laser sensors in this embodiment. The distance sensors 8.1, 8.2, 8.3 emit measurement beams 10.1, 10.2, 10.3, such that the measurement beams run parallel to the vertical longitudinal plane V through to the vehicle 1. The measurement beams 10.1, 10.2, 10.3 are also substantially horizontal in this embodiment. The measurement beams 10.1, 10.2, 10.3 from the distance sensors 8.1, 8.2, 8.3 are also directed toward the rear in relation to the vehicle 1. Three distance sensors 8.1, 8.2, 8.3 are therefore attached to the vehicle in the system 2 described herein, such that they emit parallel laser measurement beams 10.1, 10.2, 10.3 toward the rear.

The structure of the swap body 4 can also be seen in FIGS. 1 to 3. The swap body 4 is substantially comprised of a container 47, which is supported on legs 45 in the state shown in FIGS. 1 to 3. The legs support the swap body 4, and are arranged substantially symmetrically at a lateral distance to a central plane 46 through the swap body 4. The legs 45 support the swap body 4 and can be released and pivoted upward, once the swap body 4 is placed on the vehicle. In addition, the legs 45 may be designed such that they can be displaced laterally and/or vertically on the swap body 4.

There is a guide channel 44 on the undersurface or base 41 of the swap body, formed by laterally spaced apart guide elements or guide rails 42, 43. The guide rails 42, 43 extend in the longitudinal direction of the swap body 4, and are permanently mounted on the undersurface of the swap body. The inner surfaces 42.1, 43.1 of the guide rails 42, 43 face one another. The swap body 4 has an end surface 48 facing the vehicle while the vehicle is aligning itself under the swap body 4. The guide rails 42, 43 form an alignment funnel 49 near the end surface 48 of the swap body 4. The alignment funnel 49 forms a region where the distance between the inner surfaces 42.1, 43.1 of the guide rails 42, 43 decreases somewhat, starting from the end surface.

As can be seen in FIG. 2, the distance sensors 8.1, 8.2 are aligned on the vehicle such that their measurement beams 10.1, 10.2 each pass laterally outside the guide rollers behind them. At the same time, the distance sensors 8.1, 8.2 are aligned such that they are able to detect measurement points on the guide rails 42, 43. The height of the receiving structure on the vehicle can be adjustable. In this manner, the measurement beams 10.1, 10.2, or the distance sensors 8.1, 8.2, respectively, can be moved to a height at which they can detect the guide rails 42, 43 on the swap body. If the vehicle 1 is placed ideally in front of the swap body 4, the measurement beams 10.1, 10.2 then run parallel to the inner surfaces 42.1, 43.1 of the guide rails 42, 43 through the guide channel 44. In this case, none of the measurement points on the guide rails 42, 43 are detected by these two distance sensors 8.1, 8.2. As can be seen in FIG. 1, the third sensor 8.3, which is located above the two distance sensors 8.1, 8.2, is at such a height that it then detects an end surface 48 of the swap body 4 when the distance sensors 8.1, 8.2 are at a height at which they can detect the guide rails 42, 43.

In order to obtain a very precise measurement, the measurement beams 10.1, 10.2 are as close as possible to the guide rollers 15.1, 15.2, 15.3, 15.4 according to this embodiment, such that these measurement beams 10.1, 10.2 are at a distance to one another that is somewhat shorter than the spacing between the inner surfaces 42.1, 43.1 of the guide rails 42, 43. This makes it possible to detect even small angular offsets between the vehicle 1 and the swap body 4.

To align the sensors 8.1, 8.2 such that their measurement beams 10.1, 10.2 pass by the guide rollers in the manner described above, the system has a calibration system, which shall be described below in reference to FIG. 3. The calibration system contains calibration devices K3, K4 for providing features that a distance sensor is to be aimed at. The calibration system also has an adjustment device for aligning the distance sensors 8.1, 8.2 with the features provided by the calibration devices K3, K4. It should be noted that calibration devices K3, K4 are shown in FIG. 3 that are suitable for calibrating the distance sensor 8.1. Although they are not shown, there are also corresponding calibration devices for calibrating the distance sensor 8.2, which are symmetrical to the calibration devices shown in FIG. 3.

As described above, the guide rollers are placed in the guide roller receivers. The calibration devices K3, K4 are designed such that they can be secured in the guide roller receivers 12.3, 12.4 for the guide rollers 15.3, 15.4 in a predetermined orientation in this embodiment. For the calibration, the guide rollers 15.3, 15.4 are first removed from the respective guide roller receivers 12.3, 12.4, and the calibration devices K3, K4 are placed in these guide roller receivers 12.3, 12.4. The calibration device K3, i.e. the calibration device closer to the sensor 8.1, has a hole through which light can pass. The calibration device K4 has a mark. For the calibration, the sensor 8.1 is aligned such that its measurement beam 10.1 passes first through the hole in the calibration device K3, and then strikes the mark on the calibration device K4. For this, the system 2 can also contain an adjustment device, not shown in detail, that enables a lateral and a vertical positioning of the sensor 8.1 that is to be calibrated, and also enables an adjustment of the orientation of the measurement beam 10.1 from the sensor 8.1. As soon as the sensor 8.1 is calibrated as desired, the calibration devices K3, K4 can be removed from the guide roller receivers 12.3, 12.4 and replaced with the guide rollers 15.3, 15.4. The calibration devices are aligned in this embodiment such that the measurement beam 10.1 from the distance sensor 8.1 runs at a tangent past the aforementioned conical outer surfaces of the guide rollers 15.3, 15.4. The distance sensor 8.2 is calibrated accordingly, symmetrically to the vertical longitudinal plane V through the vehicle 1.

A method for determining a position and/or orientation of a swap body in relation to the vehicle 1 while aligning the vehicle under the swap body 4 can be carried out using a system of this type. The steps of the method according to the present embodiment are shown schematically in FIG. 4.

Figure 4:
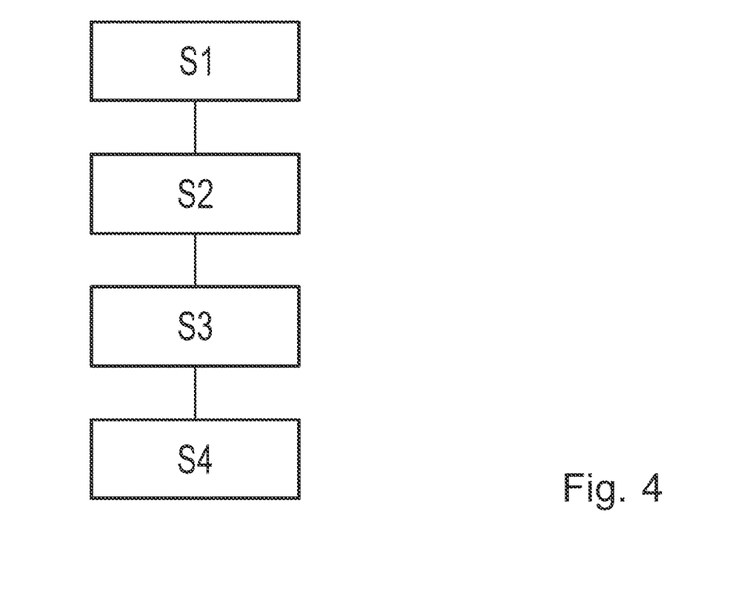
FIG. 4 shows, schematically, a step for determining a position and/or orientation of a swap body in relation to a vehicle.

The method first has an optional step S1 for calibrating two distance sensors 8.1, 8.2, such that their respective measurement beams 10.1, 10.2 pass by the guide rollers 15.1, 15.2, 15.3, 15.4 located behind the respective distance sensors 8.1, 8.2 in the longitudinal direction of the vehicle 1. This step is useful in particular the first time the system is put in operation on a vehicle 1, in order to correctly align the distance sensors. This calibration step can be subsequently carried out for maintenance purposes.

In a second step S2, the distance sensors 8.1, 8.2, 8.3 are positioned such that they can detect predetermined measurement points M1, M2, M3 on the swap body 4 when aligning the vehicle 1. As stated above, there are two measurement points M1, M2 on the inner surfaces 42.1, 43.1 of the guide rails 42, 43 in the guide channel 48 on the swap body 4. The positioning takes place in this embodiment by actuating a lifting mechanism (not shown) for raising and lowering the receiving structure 13.

In another step S3, a respective longitudinal distance D1, D2, D3 between the vehicle 1 and the measurement points M1, M2, M3 on the swap body 4 can then be determined with the distances sensors positioned in this manner. In a subsequent step S4, a relative position and/or relative orientation of the swap body 4 to the vehicle 1 can then be determined from the signals provided by the distance sensors, based on the determined longitudinal distances D1, D2, D3. Different relationships of the vehicle 1 to the swap body 4 can be determined with the system and the method described herein, as shall be explained in reference to FIGS. 5 to 10.

Figure 5:
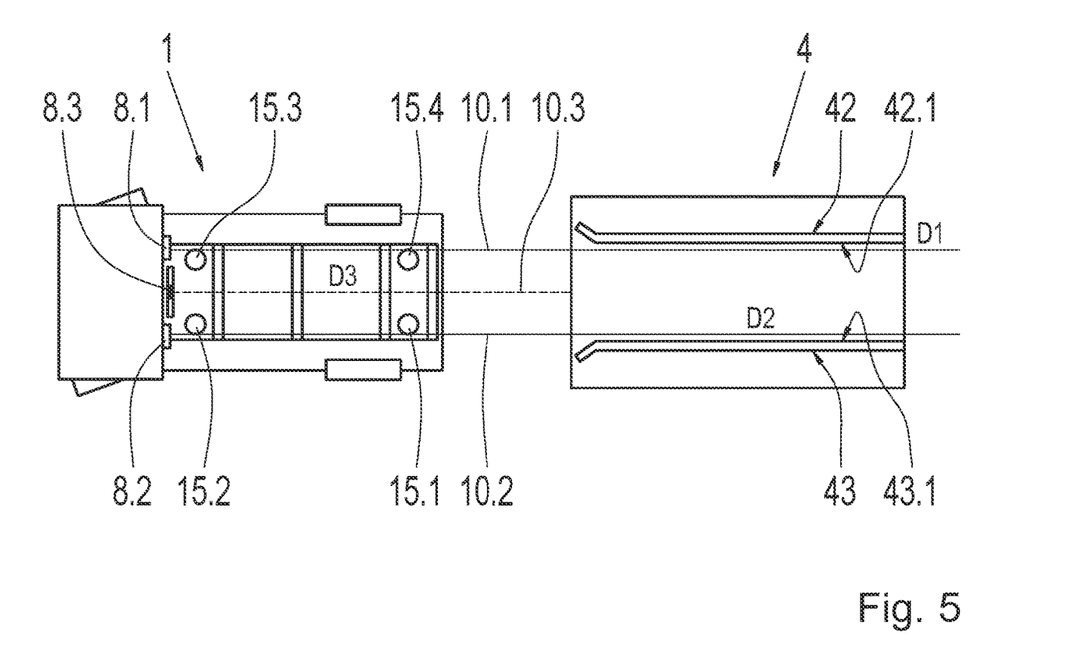
FIGS. 5 and 6 show states in which the vehicle is aligned in front of the swap body, with and without a lateral offset.

FIG. 5 shows a state in which the vehicle is in the optimal position in front of the swap body for receiving it. In this state, the distance sensor 8.3 detects a distance D3 to the end surface 48 of the swap body. The two other sensors 8.1, 8.2 detect significantly greater distances, because the measurement beams 10.1, 10.2 thereof pass through the guide channel 44 on the swap body 4. The detected distance D3 is therefore significantly shorter than the detected distances D1, D2. This indicates that the vehicle is centered in front of the swap body 4, and aligned therewith.

Figure 6:
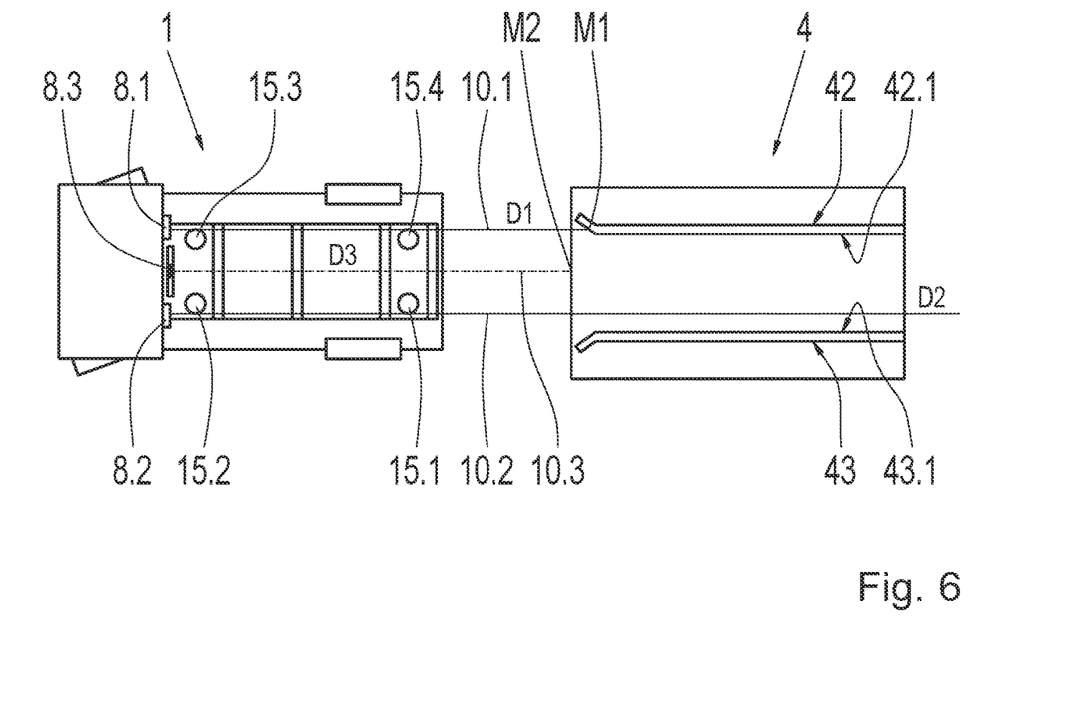

In the state shown in FIG. 6, the vehicle is offset slightly to the swap body 4. The distance sensor 8.3 again detects a distance D3 to the end surface 48 of the swap body, or a measurement point M2 thereon. The distance sensor 8.1 detects a distance D1 to a measurement point M1 located on the inner surface of the guide rail 42, specifically in the alignment funnel 49. The distance sensor 8.2 detects a distance that is significantly greater than the other two distances, because the measurement beam 10.2 passes through the guide channel 44 on the swap body 4, and does not strike a measurement point on the swap body 4. In this state, the distance D1 is only slightly greater than the distance D3, and the distance D2 is significantly greater than other the two. Such a result indicates that the vehicle is offset to the swap body 4, but aligned therewith.

Figure 7:
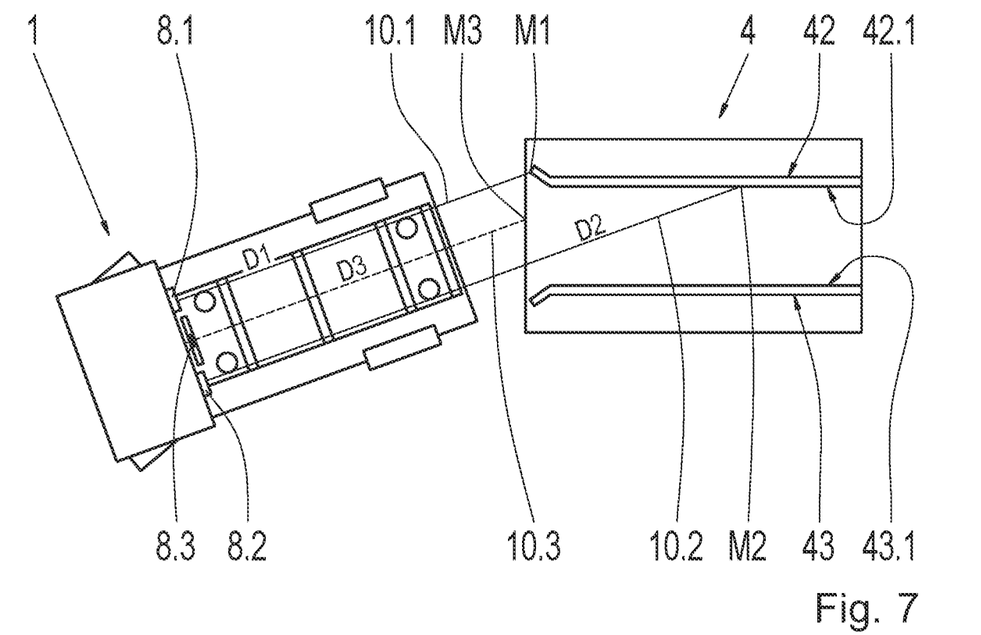
FIGS. 7 and 8 show a vehicle that at an angle to the swap body, with and without a lateral offset.
Figure 8:
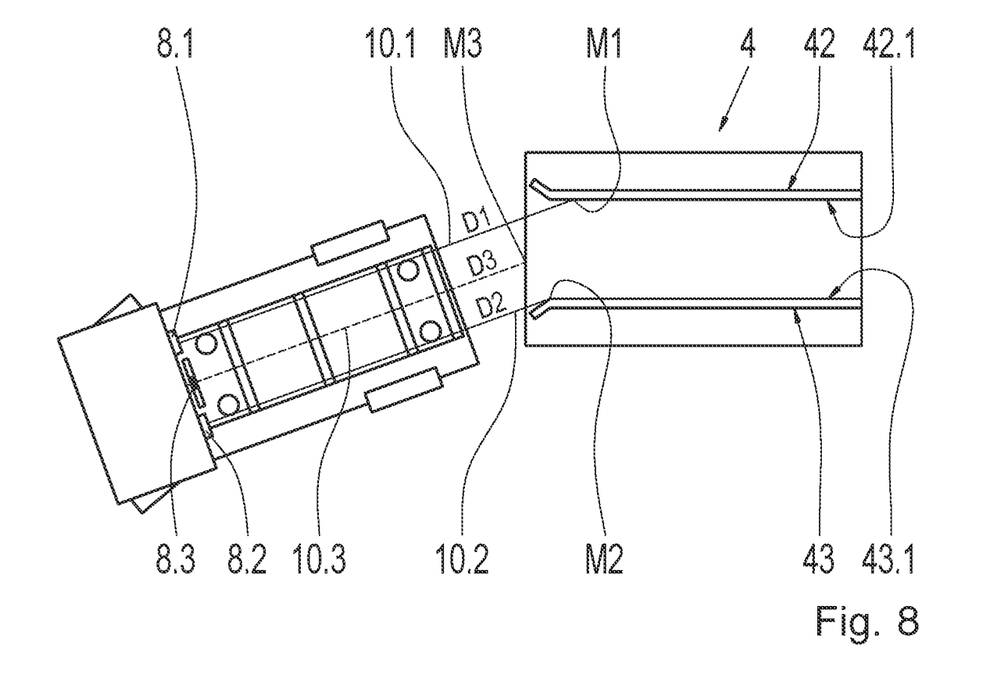

FIGS. 7 and 8 show states in which the vehicle 1 is at an angle or different orientation to the swap body 4. In FIG. 7, the sensors 8.1, and 8.3 detect distances D1 and D3, respectively, that are more or less equal. The distance D1 is slightly greater than the distance D3. The measurement beam 10.2 from the distance sensor 8.2 strikes the inner surface 42.1 of the guide rail 42, more precisely a measurement point M2 thereon. The distance D2 is significantly greater than the two distances D1, D3. From this it can be derived that the vehicle is oriented such that the guide rollers would still enter the guide channel. An angle can be derived from the measured distances, indicating the orientation of the vehicle 1 in relation to the swap body 4.

The state shown in FIG. 8 is similar to that in FIG. 7. The difference is that the vehicle is shifted slightly to the right with respect to the end surface 48 of the swap body in FIG. 8. The measurement beam 10.1 from the distance sensor 8.1 strikes an inner surface of the guide rail 42, more precisely the measurement point M1 thereon. The measurement beam 10.3 from the distance sensors 8.3 strikes a measurement point M3 on the end surface 48 of the swap body, and outputs a determined distance D3. The measurement beam 10.2 from the distance sensor 8.2 strikes the other guide rail 43 at a measurement point M2, which is located shortly before the end of the alignment funnel 49. It can be derived from these measured distances that the vehicle is at an angle to the swap body 4, but the guide rollers would still enter the guide channel 44 in this alignment.

REFERENCE SYMBOLS 1 vehicle
2 system
3 wheels
4 swap body
41 undersurface
42 guide rail
42.1 inner surface
43 guide rail
43.1 inner surface
44 guide channel
45 leg
46 middle plane
47 container
48 end surface
49 alignment funnel
5 driver's cab
8 measurement device
8.1, 8.2, 8.3 distance sensors
10.1, 10.2, 10.3 measurement beams
12.3, 12.4 guide roller receivers
M1, M2, M3 measurement points
13 receiving structure
14 signal processing device
15.1, 15.2, 15.3. 15.4 guide elements/guide rollers/alignment rollers
D1, D2, D3 distances
V vertical longitudinal plane
K3, K4 calibration devices

The invention claimed is:

1. A system for determining a position and orientation of a swap body in relation to a vehicle while aligning the vehicle under the swap body, comprising:
at least three distance sensors placed on the vehicle oriented in the longitudinal direction thereof, each of which is configured to determine a longitudinal distance between the vehicle and predetermined measurement points on the swap body, and output a corresponding signal; and
a signal processor that is configured to determine a relative position and a relative orientation of the swap body to the vehicle based on the signals output by the at least three distance sensors, and output a corresponding output signal,
wherein each of the three distance sensors emits a measurement beam for measuring the longitudinal distance, which runs parallel to a longitudinal axis of the vehicle,
wherein two distance sensors are arranged at a lateral distance to one another on the vehicle, and
wherein the two distance sensors are aligned on the vehicle such that their respective measurement beams pass laterally by guide rollers located behind the distance sensors in the longitudinal direction of the vehicle.

2. The system according to claim 1, wherein the two distance sensors can be arranged on the vehicle symmetrically to one another in relation to a vertical longitudinal plane through the vehicle.

3. The system according to claim 1, wherein the two distance sensors are aligned on the vehicle such that their respective measurement beams pass laterally outside guide rollers located behind the respective distance sensors in the longitudinal direction of the vehicle.

4. The system according to claim 1, wherein the two distance sensors are aligned on the vehicle such that their respective measurement beams pass by the guide rollers located behind the respective distance sensors in the longitudinal direction of the vehicle at a tangent to a conical section of the guide rollers and substantially at half the height of the guide rollers.

5. The system according to claim 1, further comprising:
a calibration device configured to provide a feature that at least one of the three distance sensors is to be aimed at, wherein the at least one of the three distance sensors is configured to be aimed at the feature.

6. The system according to claim 5, wherein the feature is at least one of a mark or a hole through which light passes.

7. The system according to claim 5, wherein the calibration device is configured to be placed in a guide roller hole for the guide rollers.

8. The system according to claim 5, wherein the distance sensors are configured to be laterally and vertically positioned on the vehicle and have an orientation of the distance sensors adjusted.

9. The system according to claim 1, wherein one distance sensor is placed at a higher position than the other two distance sensors, to detect an end surface of the swap body.

10. The system according to claim 1, wherein the three distance sensors are laser sensors.

11. A vehicle for receiving a swap body with a receiving structure for receiving a swap body, the vehicle comprising the system according to claim 1.

12. The vehicle according to claim 11, wherein the vehicle comprises a controller for autonomous operation, which at least enables autonomous operation while aligning the swap body, wherein the controller for autonomous operation receives the output signal from the signal processor.

13. A method for determining a position and orientation of a swap body in relation to a vehicle while aligning the vehicle under the swap body with a system or vehicle, the method comprising:
determining a longitudinal distance between the vehicle and predefined measurement points on the swap body with a plurality of distance sensors arranged on the vehicle and oriented toward a rear in the longitudinal direction of the vehicle,
positioning the plurality of distance sensors such that they can detect the predefined measurement points on the swap body when aligning the vehicle, wherein at least two of the measurement points lie on the inner surfaces of guide rails forming a guide channel on the swap body, and at least one measurement point lies on an end surface of the swap body, and
determining a relative position and a relative orientation of the swap body to the vehicle based on the determined longitudinal distance.

14. The method according to claim 13, further comprising: calibrating at least two of the plurality of distance sensors such that their respective calibrated measurement beams pass laterally outside guide rollers located behind the respective distance sensors in the longitudinal direction of the vehicle.

15. The method according to claim 14, wherein calibrating the at least two of the plurality of distance sensors further comprises:
placing a calibration device in each guide hole for the guide rollers located behind the at least two of the plurality of distance sensors in the longitudinal direction of the vehicle; and
positioning the at least two of the plurality of distance sensors such that their positions and orientations correspond to specifications based on the calibration device.

16. A method for determining a position and orientation of a swap body in relation to a vehicle while aligning the vehicle under the swap body with a system or vehicle, the method comprising:
determining a longitudinal distance between the vehicle and predefined measurement points on the swap body with a plurality of distance sensors arranged on the vehicle and oriented toward a rear in the longitudinal direction of the vehicle,
calibrating at least two of the plurality of distance sensors such that their respective calibrated measurement beams pass laterally outside guide rollers located behind the respective distance sensors in the longitudinal direction of the vehicle, and
determining a relative position and a relative orientation of the swap body to the vehicle based on the determined longitudinal distance.

17. The method according to claim 16, wherein calibrating the at least two of the plurality of distance sensors further comprises:
placing a calibration device in each guide hole for the guide rollers located behind the at least two of the plurality of distance sensors in the longitudinal direction of the vehicle; and
positioning the at least two of the plurality of distance sensors such that their positions and orientations correspond to specifications based on the calibration device.

* * * * *